United States Patent [19]

Schön et al.

[11] 4,039,493

[45] Aug. 2, 1977

[54] MELAMINE-FORMALDEHYDE CONDENSATES AND MIXTURES THEREOF

[75] Inventors: Manfred Schön, Dudenhofen; Helmut Dürr, Frankfurt am Main; Dieter Plath, Wiesbaden; Karlfried Keller, Bergen-Enkheim; Walter Michel, Frankfurt am Main, all of Germany

[73] Assignee: Cassella Farbwerke Mainkur Aktiengesellschaft, Germany

[21] Appl. No.: 590,215

[22] Filed: June 25, 1975

[30] Foreign Application Priority Data

June 27, 1974 Germany .............................. 2430899

[51] Int. Cl.$^2$ ......................... C08K 5/05; C08L 61/20; C08L 91/00
[52] U.S. Cl. ............................... 260/21; 260/29.4 R; 260/33.4 R; 260/67.6 R
[58] Field of Search ..................... 260/29.4 R, 33.4 R, 260/67.6 R, 21

[56] References Cited

U.S. PATENT DOCUMENTS

| 3,458,464 | 7/1969 | Shriver et al. | 260/67.6 R |
| 3,562,001 | 2/1971 | McGuire | 260/29.4 R |
| 3,647,755 | 3/1972 | Giller | 260/67.6 R |

Primary Examiner—Harry Wong, Jr.
Attorney, Agent, or Firm—Connolly and Hutz

[57] ABSTRACT

Low-viscosity high-solids-content melamine-formaldehyde condensates having high reactivity, low content of free formaldehyde and good compatibility, are prepared by effecting condensation in an alcohol having up to 3 carbons, then concentrating the condensate and heating the concentrate in a higher alcohol having from 3 to 18 carbons and again concentrating. The final product cures on heating to a hard glossy film and can be added to other uncured resins to improve the hardness of their films.

10 Claims, No Drawings

MELAMINE-FORMALDEHYDE CONDENSATES AND MIXTURES THEREOF

This invention relates to melamine resins.

Among the objects of the present invention is the provision of low-viscosity high-solids-content malamine-formaldehyde condensate solutions having a low content of free formaldehyde, high reactivity and good compatibility with hydrophobic components.

Additional objects of the present invention include the provision of melamine-formaldehyde-containing lacquers that produce very hard coatings.

According to the present invention malamine and formaldehyde, in a molar ratio of about 1:2.0 to about 1:4.5 respectively, mixed with about 3 to about 20 mols per mol of malamine of at least one alcohol having 1, 2 or 3 C atoms, are heated in the presence of a condensation-catalyzing proportion of acid at from about 40° to about 120° C, for 1 to 10 hours to effect condensation; the resulting mixture is neutralized and the alcohol together with water is distilled from the neutralized mixture until the residue reaches a solids content of at least 85% by weight; 0.5 to 10 mols of at least one alcohol having from 3 to 18 C atoms are thereafter added to the distillation residue, per original mol of melamine; and vaporizable material is again distilled off until the residue of the vaporization reaches a solids content of 65 to 80 percent by weight. Preferably, the condensation heating is at about 50° to 100° C. It is also preferred that the alcohol having from 3 to 18 C atoms is an alcohol having from 3 to 8 C atoms. In addition, the second distilling off operation gives best results when it is continued until a solids content of 70–75% by weight is achieved.

The alcohols of the present invention are simple hydrocarbon mono-ols. While primary and secondary alcohols give best results, tertiary alcohols can also be used. Methanol is the preferred alcohol for the condensation step.

The catalytic acid employed may be any of the well-known condensation-catalyzing acids including strong organic or inorganic acids, e.g. formic acid, acetic acid, p-toluenesulphonic acid, hydrochloric acid, sulphuric acid or nitric acid. The catalytic proportion of acid employed is preferably about 0.001 to about 3%, and more preferably about 0.01 to about 1%, based on the weight of the combined reactants.

The formaldehyde employed may at least partially be in the form of paraformaldehyde or aqueous or alcoholic 30 to 45% by weight formaldehyde solution, or mixtures of these. Under otherwise comparable condensation conditions, the viscosity of the melamine-formaldehyde condesable solution rises as the initial water content of the reactants increases. Since a high viscosity is to be avoided, it is advantageous to employ a condensation solution that contains not more than about 25% by weight of water.

The alcohol used in the condensation heating serves as a solvent and also to etherify the methylolmelamines formed by the condensation. The condensation mixture may be heated under reflux at least until a clear solution has been formed, but it is desirable that it should be heated under reflux only until a sample concentrated in vacuo (suitably at 10-400 mm Hg) to a solids content of 70% by weight, has a viscosity at 25° C of less than about 50 poises, a viscosity of about 3 to about 30 poises normally being appropriate.

The neutralization of the present invention can be effected with any alkali, for example, sodium carbonate or potassium carbonate or sodium hydroxide or potassium hydroxide. The neutralization essentially terminates the condensation as well as the etherification, and the excess alcohol can then be distilled off together with the water present, without significantly increasing the degree of condensation or etherification. The water distilled off includes water of reaction formed in the condensation and in the etherification. In addition, water can have been introduced with paraformaldehyde when that reagent is used, or as a solvent with the formaldehyde. In order to obtain resins of a low viscosity and good compatibility the distillation of the condensation alcohol is terminated when the temperature of the distilland reaches 105° C. The pressure at which this distillation takes place can be reduced to about 200 mm Hg to bring the residue to its minimum content of water.

At least one alcohol having 3 to 18 C atoms, preferably 3 to 8 C atoms, is then added in a quantity of from about 0.5 to about 10 mols per mol of melamine in the original mixture. Examples of alcohols suitable for this purpose are: n-propanol, i-propanol, n-butanol, sec.-butanol, i-butanol, i-amyl alcohol, n-hexanol, sec.-hexanol, n-octanol 2-ethyl-hexanol-(1), lauryl alcohol and stearyl alcohol. Such alcohols can be replaced, to the extent of up to 80% by weight, by customary, known hydrocarbon-lacquer solvents, such as, for example, xylene, toluene, Solvesso (a high-boiling aliphatic hydrocarbon mixture) or mineral spirits.

After the dilution, material is again removed by distillation until a solids content of about 65 to about 80% by weight, preferably about 70 to about 75% by weight, has been achieved.

The compatibility of the condensates manufactured in accordance with the invention, particularly of the methyletherified condensates, with hydrophobic components, such as, for example, i-butanol, xylene, other solvents of the hydrocarbon series and long-oil alkyd resins, can be improved even further if a trans-etherification with higher alcohols is carried out after the original condensation and after distilling off the condensation alcohol and the water. This trans-etherification is initiated by the addition of catalytic quantities of acid along with the 3 to 18 carbon alcohol. These can be the same inorganic and organic acids which catalyse the original condensation, but it is preferred that only about half the quantity of condensation-catalyzing acid be used for the trans-etherification. About 0.005 to about 0.5% of acid catalyst, relative to the weight of the reaction mixture present, is generally sufficient. After adding the acid, the mixture is trans-etherified until about 5 to about 50% of the alkoxyl groups present before the trans-etherification have been trans-etherified with the alcohol having 3 to 18 C atoms, preferably 3 to 8 atoms. Thw trans-etherification can be completed within about one hour, if accelerated by heating, as for example under reflux at normal pressure. Trans-etherification is slowed down by having the trans-etherifying alcohol diluted with more than about 50% by weight with hydrocarbon solvent. To effect the trans-etherification, primary C3 to C18 alcohols are preferably used, in particular, primary C3 to C8 alcohols.

After the trans-etherification has ended, the transetherifying mixture is neutralized and the excess alcohol is distilled off until a solids content of about 65 to about 80% by weight, preferably about 70 to about 75% by weight, is reached, surprisingly, the viscosity of the finished condensate solution does not, as a rule, increase as a result of the trans-etherification; in many cases even a reduction in the viscosity is observed.

It is generally advisable to filter the resulting condensate solution, for example through kieselguhr, to clarify it.

A melamine-formaldehyde condensate solution in an alcohol, or alcohol mixture, having 3 to 18 C atoms, preferably 3 to 8 C atoms, or a mixture of these alcohols with lacquer solvents of the hydrocarbon series is thus obtained, having a solids content of about 65 to about 80% by weight, preferably about 70 to about 75% by weight, and a viscosity of about 3 to about 50 Poises, preferably about 4 to about 30 Poises, at 25° C. Prior azeotropically distilled concentrates have generally had viscosities of more than 100 Poises in the same solvent at a solids content of 70%.

The content of free formaldehyde in the melamine condensate solutions manufactured in accordance with the present invention is at most 0.6% by weight, which is still hardly perceptible by odor, while the known, low-viscosity melamine resins manufactured by etherifying highly methylolated melamines with water-soluble alcohols, have about 2% by weight free formaldehyde, and have a distinctly irritating effect.

The melamine condensate solutions manufactured in accordance with the present invention have a water content below 2% by weight and can be diluted with at least 1.5 times their weight of isobutanol. The can in most cases be diluted with isobutanol in any ratio.

Their compatibility with xylene permits dilution with at least an equal weight of that solvent, and when mixed with longoil alkyd resins, polyesters and acrylate resins to make a lacquer, no flow problems are found.

The reactivity of the condensate solutions manufactured in accordance with the present invention reaches at least the same values as the known and commercially available condensates.

Compared with the known lacquer resins, the melamine condensate solutions manufactured according to the present invention are distinguished by a low viscosity for a high reactivity and by a low content of free formaldehyde with, at the same time, a good compatibility with hydrophobic components. Owing to the low content of volatile solvents and low content of free formaldehyde, these condensates cause very little environmental pollution. They are admirably used in finishing textiles and paper and, in combination with alkyd resins, oil-free polyesters or acrylate resins, for the manufacture of scratch-resistant coating of high gloss and very good resistance to weathering.

In order to prepare thermosetting baking varnishes 10 to 50 parts of the melamine resins of the present invention, the solutions of which can at least partly be diluted with water, are combined with 90 to 50 parts by weight of an alkyd resin or an acrylate resin and are stoved at temperatures of between 80° and 160°, preferably 100° - 130° together with the customary lacquer and varnish additives, if necessary in the presence of a catalyst.

Alkyd resins are made in accordance with processes known per se by allowing mono or polycarboxylic acids to react with polyols or by trans-esterifying the low-chain esters of the mono or polycarboxylic acids with polyols, if necessary in the presence of plant oils. Processes of making alkyd resins are described in 1. W. M. Kraft, Am. Paint J. 41,96(1957)
2. E. W. Boulger et al. Office. Dig. Federation Paint Varnish Prod. Clubs 418,1364 (1959)
3. H. F. Payne Organic Coating Technology, Vol. 1, John Wiley + Sons, Inc. New York, 1954 pp 269 – 325.

Hydroxy-group containing acrylate resins are prepared in the conventional manner by co-polymerisation of hydroxyalkyl esters of acrylic acid or methacrylic acid for example 2-hydroxyethylmethacrylate, with esters of the acrylic or methacrylic acid, such as methylmethacrylate and butylacrylate, and styrene, preferably in organic solvents in the presence of organic peroxides as catalysts. Processes of preparing acrylate resins in combination with etherified melamine resins are described in:

1. Industrial Engineering Chemistry, Vol 53 (1961) No. 6 pp 466 – 468
2. Journal of Applied Polymer Science, Vol 7 (1963) pp 1991 – 2002
3. U.S. Pat. No. 2.853 462

The example which follow serve to illustrate the invention further. Percentages and parts are by weight unless otherwise noted.

EXAMPLE 1

966 parts by weight ethanol, 201 parts by weight paraformaldehyde (90% strength, residue water), 189 parts by weight melamine and 0.75 parts by weight p-toluene-sulphonic acid containing one mol of water of crystallization per mol, are mixed and heated, with stirring and under reflux, in a 21. three-necked flask for 3 hours, a clear solution being formed. A 20 ml sample rapidly concentrated in vacuo to 70% by weight solids content has a viscosity of 17 poises at 25° C, indicating that the condensation can be terminated. After adding 0.5 part by weight of anhydrous sodium carbonate aqueous ethanol is distilled off, first until the internal temperature is 95° C and, subsequently, until the internal temperature is 105° C at 200 mm Hg. The residue is then dissolved in 300 parts by weight of isobutanol and, after then distilling off 80 parts by weight of solvent the final solution is filtered through kieselguhr.

The resulting 70% strength by weight melamine condensate solution has the following properties:
viscosity at 25° C: 21.2 poises;
dilutability with xylene: 1:5; and
dilutability with isobutanol: infinite.

EXAMPLE 2

840 parts by weight n-propanol, 133 parts by weight paraformaldehyde (90% strength, residue water), 126 parts by weight melamine and 0.5 part by weight of p-tolunesulphonic acid containing one mol of water of crystallization per mol, are mixed and heated with stirring and under reflux, in a 21. three-necked flask for 3–178 hours, a clear solution being formed. At this point a sample concentrated in vacuo to 70% by weight solids content has a viscosity of 26 poises at 25° C. After adding 0.4 part by weight of anhydrous sodium carbonate aqueous n-propanol is distilled off, first until the internal temperature is 95° C and, subsequently, until the internal temperature is 105° C at 150 mm Hg. The residue is dissolved in 250 parts by weight of isobutanol and, after distilling off 50 parts by weight of solvent, the solution is filtered through kieselguhr.

The resulting 70% strength by weight melamine condensate solution has the following properties:
viscosity at 25° C: 29.8 poises;

dilutability with xylene: infinite; and
dilutability with isobutanol: infinite.

EXAMPLE 3

896 parts by weight methanol, 267 parts by weight paraformaldehyde (90% strength, residue water), 252 parts by weight melamine and one ml. 4 n hydrochloric acid, are mixed and heated, with stirring and under reflux, in a 2 l. three-necked flask for 5 hours, a clear solution being formed. A sample then concentrated in vacuo to 70% by weight solids content has a viscosity of 21 poises at 25° C. after adding 0.5 part by weight of anhydrous sodium carbonate, aqueous methanol is distilled off, first until the internal temperature is 95° C and, subsequently, until the internal temperature is 105° C at about 250 mm Hg. The residue is dissolved in 300 parts by weight of isobutanol and, after distilling off 80 parts by weight of solvent, the final solution is filtered through kieselguhr.

The resulting 70% strength by weight melamine condensate solution has the following properties:
viscosity at 25° C: 23.8 poises;
dilutability with xylene: 1:1; and
dilutability with isobutanol: 1:1.5.

EXAMPLE 4

896 parts by weight methanol, 267 parts by weight paraformaldehyde (90% strength, residue water), 252 parts by weight melamine and 1 part by weight p-toluenesulphonic acid containing one mol of water of crystallization per mol, are mixed and heated, with stirring and under reflux, in a 2 l. three-necked flask for 5 hours, a clear solution being formed. A sample concentrated in vacuo to 70% by weight solids content then has a viscosity of 21 poises at 25° C. After adding 0.35 part by weight of anhydrous sodium carbonate, aqueous methanol is distilled off, first until the internal temperature is 95° C and, subsequently, until the internal temperature is 105° C under a pressure of 200 mm Hg. 400 parts by weight of isobutanol are added to the residue and this mixture then heated under reflux for 1 hour in the presence of 0.5 part by weight of p-toluenesulphonic acid containing one mol of water of crystallization. After now adding 0.2 part by weight of anhydrous sodium carbonate and removing the excess, and distilling off 50 parts by weight of solvent, the mixture is stirred for approximately 15 minutes more and is then filtered through kieselguhr.

THe resulting 70% strength by weight melamine-formaldehyde resin concentrate solution has the following properties:
viscosity at 25° C: 5.2 poises
dilutability with xylene: 1:6.
dilutability with isobutanol: infinite This product contains approximately 2.4 mols of methyl-etherified methylol groups and approximately 0.8 mol of isobutyl-etherified methylol groups, per mol of melamine.

EXAMPLE 5

1,288 parts by weight ethanol, 267 parts by weight paraformaldehyde (90% strength, residue water), 252 parts by weight melamine and 1 part by weight p-toluenesulphonic acid containing one mol of water of crystallization per mol, are mixed and heated with stirring and under reflux, in a 2 l. three-necked flask for 2 hours, forming a clear solution. A sample concentrated in vacuo to 70% by weight solids content has a viscosity of 17 poises at 25° C. The clear solution is processed further as in Example 4.

The resulting melamine resin condensate solution has 70% condensate and the following properties:
viscosity at 25° C: 18 poises;
dilutability with xylene: infinite; and
dilutability with isobutanol: infinite.

This product contains approximately 1.9 mols of ethyl-etherified methylol groups and approximately 1.4 mols of isobutyl-etherified methylol groups, per mol of melamine.

EXAMPLE 6

448 parts by weight methanol, 267 parts by weight paraformaldehyde (90% strength, residue water), 252 parts by weight melamine and 1 part by weight p-toluenesulphonic acid containing one mol of water of crystallization per mol, are mixed and heated with stirring and under reflux, in a 2 l. three-necked flask for 3-178 hours, a clear solution being formed. A 10 ml. sample concentrated in vacuo to 70% by weight solids content has a viscosity of 46 poises at 25° C. After adding 0.35 part by weight of anhydrous sodium carbonate, aqueous methanol is distilled off, first until the internal temperature is 95° C and, subsequently, until the internal temperature is 105° C under a pressure of 200 mm Hg. 600 parts by weight of n-butanol and 0.5 part by weight of p-toluenesulphonic acid containing one mol of water of crystallization are added to the residue and the resulting mixture heated under reflux for 1 hour. After then adding 0.2 part by weight of anhydrous sodium carbonate 200 parts by weight of solvent are distilled off and the final solution is filtered through kieselguhr.

The resulting 70% strength by weight melamine formaldehyde resin condensate solution has the following properties:
viscosity at 25° C: 39 poises;
dilutability with xylene: 1:6; and
dilutability with isobutanol: 1:8.

This product contains about 1.9 mols of methyl-etherified methylol groups and about 0.9 mol of butyl-etherified methylol groups, per mol of melamine.

EXAMPLE 7

896 parts by weight methanol, 213 parts by weight paraformaldehyde (90% strength, residue water), 252 parts by weight melamine and 1 part by weight of p-toluenesulphonic acid containing one mol of water of crystallization per mol, are mixed and heated with stirring and under reflux, in a 2 l. three-necked flask for 6-176 hours to form a clear solution. A sample then taken and concentrated in vacuo to 70% by weight solids content has a viscosity of 29 poises at 25° C. The bulk of the solution is processed further as indicated in Example 6.

The resulting 70% strength by weight melamine-formaldehyde condensate has the following properties:
viscosity at 25° C: 15.3 poises;
dilutability with xylene: 1:6; and
dilutability with isobutanol: 1:8.

The product contains 2.4 mols of methyl-etherified methylol groups and about 0.4 mol of butyl-etherified methylol groups per mol of melamine.

EXAMPLE 8

A mixture of 896 parts by weight methanol, 255 parts by weight paraformaldehyde (90% strength, residue water), 252 parts by weight melamine and 1 part by weight p-toluene-sulphonic acid containing one mol of water of crystallization per mol, is heated with stirring and under reflux, in a 2 l. three-necked flask for 5–176 hours, a clear solution being formed. A sample then concentrated in vacuo to 70% by weight solids content has a viscosity of 24 poises at 25° C. After adding 0.35 part by weight of anhydrous sodium carbonate to the bulk of the solution, aqueous methanol is distilled off, first until the internal temperature is 95° C and, subsequently, until the internal temperature is 105° C under a pressure of 200 mm Hg. 785 parts by weight isopropanol and 1 part by weight of p-toluenesulphonic acid containing one mol of water of crystallization per mol are added to the residue and the resulting mixture is heated under reflux for 1 hour. After then adding 0.4 part by weight of anhydrous sodium carbonate, 400 parts by weight of solvent are distilled off and the resin solution is filtered through kieselguhr.

The resulting 70% strength by weight melamine resin formaldehyde condensate solution has the following properties:
viscosity at 25° C: 8.2 poises;
dilutability with xylene: 1:3.3; and
dilutability with isobutanol: infinite.

This product contains about 2.7 mols of methyl-etherified methylol groups and about 0.2 mols of isopropyl-etherified methylol groups, per mol of melamine.

EXAMPLE 9

Example 8 is repeated but this time the residue obtained after distilling off the aqueous methanol is mixed with 625 parts by weight of 2-ethyl-hexanol-(1) and 0.5 part by weight pf p-toluenesulphonic acid containing one mol of water of crystallization per mol, and the mixture is heated under reflux for one hour. After adding 0.2 part by weight of anhydrous sodium carbonate, 225 parts by weight of solvent are distilled off at 100 mm Hg. and the resin solution is filtered through kieselguhr.

The resulting 70% strength by weight melamine formaldehyde condensate solution has the following properties:
viscosity at 25° C: 24.3 poises;
dilutability with xylene: 1:4; and
dilutability with isobutanol; infinite.

This product contains 2.8 mols of methyl-etherified methylol groups and about 0.4 mol of methylol groups etherified with 2-ethylhexanol, per mol of melamine.

EXAMPLE 10

588 parts by weight methanol, 685 parts by weight aqueous methanolic formation solution containing 35% of formaldehyde, 45% of methanol and 20% of water, 252 parts by weight melamine and 1 part by weight of p-toluenesulphonic acid containing one mol of water crystallization per mol, are heated with stirring and under reflux, in a 2.1 three-necked flask for 2-¾ hours, a clear solution being formed. A sample then concentrated in vacuo to 70% by weight solids content has a viscosity of 20 poises at 25° C. After adding 0.35 part by weight of anhydrous sodium carbonate, aqueous methanol is distilled off, first until the internal temperature is 95% and, subsequently, until the internal temperature is 105° C at 200 mm Hg. 600 parts by weight of isobutanol are added to the residue along with 0.5 part by weight of p-toluenesulphonic acid containing one mol of water of crystallization per mol, and the mixture is heated under reflux for 1 hour. After adding 0.2 part by weight of anhydrous sodium carbonate, 200 parts by weight of solvent are distilled off and the final solution is filtered through kieselguhr.

The resulting 70% strength by weight melamine-formaldehyde condensate solution has the following properties:
viscosity at 25° C: 10.2 poises;
dilutability with xylene: 1:4; and
dilutability with isobutanol: infinite.

This product contains 1.9 mols of methyl-etherified methylol groups and approximately 0.9 mol of isobutyl-etherified methylol groups, per mol of melamine.

EXAMPLE 11

896 parts by weight methanol, 615 parts by weight of a 39% strength aqueous formaldehyde solution, 252 parts by weight melamine and 1 part by weight of p-toleunesulphonic acid containing one mol of water of crystallization per mol, are heated with stirring and under reflux, in 2 l. three-necked flask for 3 hours, a clear solution resulting. A sample concentrated in vacuo to 70% by weight solids content has a viscosity of 27 poises at 25° C. The clear solution is processed further as in Example 10.

The final 70% strength by weight melamine-formaldehyde condensate solution has the following properties:
viscosity at 25° C: 14.2 poises;
dilutability with xylene: 1:4.3; and
dilutability with isobutanol: infinite.

This product contains about 1.9 mols of methyl-etherified methylol groups and about 0.9 of isobutyl-etherified methylol groups, per mol of melamine.

EXAMPLE 12

An uncured polyester is made by heating at 180 – 240° C for 18 – 22 hours 268 parts of trimthylol-propane, 31. Parts hexane diol-1,6 105 parts propan diol-1,2, 155 parts adipic acid, 670 parts of a mixture consisting of 90 parts isophthalic acid and 10 parts terephthalic acid. This polyester is a clear liquid having an acid number of 2, an OH number of approximately 150, a molecular weight of 1,000 to 2,000 and a viscosity of 40 seconds measured in 60% concentration in an 80:20 xylene isobutanol mixture at 20° C in a DIN cup with an 8 mm orifice. To 80 parts by weight of this polyester is added 20 parts by weight of the 70% isobutanol solution of melamine-formaldehyde condensate of Example 4, the resulting mixture being sprayed on a brass sheet and baked for 30 minutes at 130° C. A clear film which is free from flow marks and is very hard, having a pendulum hardness according to Konig of 150 seconds, is produced.

EXAMPLE 13

15 parts by weight of the 70% melamine-formaldehyde condensate in isobutanol prepared in accordance with Example 4, is mixed with 85 parts by weight of a copolymer according to Example 1 of German Auslegeschrift 1,494,421 composed of 52 parts by weight styrene, 30 parts by weight acrylic acid ethylhexyl ester, 16 parts by weight methacrylic acid β-hydroxyethyl ester and 2 parts by weight acrylic acid. These monomeric compounds are co-polymerized within three hours'time at 125° C with 1% benzoyl peroxide in a 50% strength solution consisting of xylene: butanol = 4 : 1 and subsequently stirred for eight hours at 115° C.

After mixing the copolymer with the melamine-formaldehyde resin solution the mixture is applied to steel sheet by dipping, and the sheets then baked 30 minutes at 120° C. Clear films which are free from flow problems and which have excellent hardness, elasticity, adhesion power and gloss are produced.

Similar effects are produced with other polyester and acrylic resins as well as with alkyd resins.

What is claimed is:

1. Process for the production of a solution of reactive hardenable melamine-formaldehyde condensate, wherein a mixture of melamine and formaldehyde, in a molar ratio of about 1 : 2.0 to about 1 : 4.5 respectively, with about 3 to about 20 mols per mol of melamine of at least one alcohol having 1, 2 or 3 C atoms, which mixture contains water in an amount no greater than about 25% by weight, is heated in the presence of a condensation-catalyzing proportion of acid at from about 40 to about 120° C, for 1 to 10 hours to effect condensation; the resulting mixture is neutralized and the alcohol together with water is distilled from the neutralized mixture until the residue reaches a solids content of at least 85% by weight; 0.5 to 10 mols of at least one alcohol having from 3 to 18 C atoms are thereafter added to the distillation residue, per original mol of melamine; and vaporizable material is again distilled off until the residue of the vaporization reaches a solids content of 65 to 80 percent by weight as well as a water content below 2% by weight.

2. Process according to claim 1, wherein the condensation-catalyzed heating is at from about 50 to about 100° C.

3. Process according to claim 1, wherein the alcohol having from 3 to 18 C atoms is an alcohol having from 3 to 8 C atoms.

4. Process according to claim 1, wherein the second distilling off operation is continued until a solids content of about 70 to about 75% by weight is achieved.

5. Process according to claim 1 wherein the residue from the first distillation is trans-etherified to the extent of about 5 to about 50% with the alcohol having from 3 to 18 C atoms.

6. Process according to claim 1, wherein the formaldehyde is at least partly paraformaldehyde.

7. A melamine-formaldehyde condensate solution produced by the process of claim 1.

8. A lacquer consisting essentially of a solution of a curable resin of the class consisting of alkyd, polyester and acrylate resins, said solution containing the melamine-formaldehyde condensate of claim 7 in an amount from about 10 to about 50% by weight of its total nonvolatiles.

9. A melamine-formaldehyde condensate solution produced by the process of claim 5.

10. Process according to claim 1 wherein the first distillation is completed when the distilland reaches a temperature of 105° C.